(12) United States Patent
Kilwin et al.

(10) Patent No.: US 7,645,406 B2
(45) Date of Patent: Jan. 12, 2010

(54) ADHESIVE INJECTION PROCESS FOR PI-JOINT ASSEMBLIES

(75) Inventors: Jeffrey J. Kilwin, St. Peters, MO (US);
Jim S. Piszar, Chesterfield, MO (US);
Christopher B. Mathiesen, University City, MO (US)

(73) Assignee: The Boeing Company, Chicago, IL (US)

( * ) Notice: Subject to any disclaimer, the term of this patent is extended or adjusted under 35 U.S.C. 154(b) by 628 days.

(21) Appl. No.: 11/111,318

(22) Filed: Apr. 21, 2005

(65) Prior Publication Data

US 2006/0243382 A1    Nov. 2, 2006

(51) Int. Cl.
*B29C 65/00* (2006.01)
(52) U.S. Cl. .................. 264/216; 156/285; 156/245; 156/87; 156/286
(58) Field of Classification Search .............. 156/285, 156/245, 87, 286; 264/216
See application file for complete search history.

(56) References Cited

U.S. PATENT DOCUMENTS 6,194,074 B1 * 2/2001 Wiesemann et al. ......... 428/422

2003/0019567 A1 * 1/2003 Burpo et al. ................ 156/245

\* cited by examiner

*Primary Examiner*—Christina Johnson
*Assistant Examiner*—Larry Thrower
(74) *Attorney, Agent, or Firm*—Yee & Associates, P.C.; James M. Poole

(57) ABSTRACT

An adhesive injection process for a Pi-joint assembly comprises the steps of: machining at least two ports into a female part of a Pi-joint assembly; inserting a filler into a gap between a male part and the female part; applying a sealant above the filler; creating a vacuum with a vacuum pump at one port; injecting an adhesive through another port; and drawing the adhesive towards the vacuum pump until the gap under the filler is completely filled with the adhesive. The adhesive injection process incorporates lean technologies that enable increased productivity during the assembly of a Pi-joint design using adhesive bonding. The adhesive injection process is suitable for, but not limited to, applications in the aerospace industry, such as the aircraft airframe assembly. The adhesive injection process may be used for the bonding of upper and lower skins to airframe structure as well as for structure-to-structure bonding.

17 Claims, 8 Drawing Sheets

ADHESIVE INJECTION PROCESS FOR PI-JOINT ASSEMBLIES

GOVERNMENT RIGHTS

This invention was made with Government support under SCRA Task Order N00014-01-2-0001 and under subrecipient agreement number 2001-508 awarded by the Department of the Navy. The Government has certain rights in this invention.

BACKGROUND OF THE INVENTION

The present invention generally relates to methods to adhesively bond sections of a Pi-joint design and, more particularly, to an adhesive injection process for Pi-joint assemblies.

Adhesive bonded primary aircraft structures have the potential to save significant weight and cost over conventional bonded and riveted or bolted joint designs. Recently, new bonded joint designs, such as the Pi-joint design, have been developed that minimize peel stresses and provide a more robust joint. The Pi-joint design includes a male and a female section bonded with an adhesive. This type of joint is more tolerant to damage and flaws than other joint designs. The Pi-joints are lighter and less expensive to fabricate than conventional mechanically fastened joints. Pi-joint designs may be used in metal-to-metal, composite-to-metal, or composite-to-composite joints. Even though the Pi-joint design has the potential to improve the performance of adhesive bonded joints, fabrication issues still exist.

Currently, methods that are used to adhesively bond the male and female section of a Pi-joint design include a plunge method, a tube withdrawal method, and an injection method.

The plunge method utilizes filling the female section of a Pi-joint design with an adhesive followed by plunging the male section of the Pi-joint design into the pool of adhesive. With the plunge method it is difficult to control the amount of pre-filled adhesive to avoid spill over, which creates a need for clean up of the adhesive. Furthermore, the male section of the Pi-joint design needs to be positioned correctly during plunging. If the male section is not at the proper depth, the adhesive must be removed and the process must be repeated. The fact that the adhesive starts curing immediately after being filled into the female section of the Pi-joint design may cause additional problems.

The tube withdrawal method utilizes a tube that is placed at the bottom of the female section of the Pi-joint design. The male section of the Pi-joint design is then positioned over the tube and all openings except the exit side where the tube is located are sealed with a tape. The adhesive is subsequently injected via the tube while the tube is being withdrawn from the Pi-joint design. After a certain time frame and prior to the curing of the adhesive, the tape must be removed and the adhesive is typically sealed with a sealant. The tube is usually withdrawn manually, which makes it difficult to maintain a certain constant rate. If the tube is withdrawn too fast, air pockets or voids may occur in the bonding area. If the tube is withdrawn too slow, the pressure of the adhesive may disbond the tape and the adhesive may blow-out and spill. In this case, a clean up of the spilled adhesive will be needed. Furthermore, the tape needs to be removed within a certain time frame after injection of the adhesive to avoid bonding of the tape with the adhesive. After removal of the tape, the adhesive typically needs to be sealed with a sealant.

The injection method includes positioning the male section of the Pi-joint design within the female section of the Pi-joint design and drilling holes into a leg of a Pi-leg of the female section of the Pi-joint design. The holes are used as ports to inject the adhesive. Before the adhesive can be injected, all openings are typically sealed with tape. The tape may disbond during injection when the pressure of the adhesive is too large and, in this case, the adhesive could blow-out and spill and, consequently, clean up of the adhesive would be required. As with the tube withdrawal method, the tape needs to be removed within a certain timeframe after injection of the adhesive. Also, the adhesive is typically sealed with a sealant after the removal of the tape. Furthermore, the bond length of the adhesive from the injection port is limited depending on the properties of the adhesive and the gap width to be filled. Typically, an injection port is needed about every 12 inches.

The difficulties associated with the above-mentioned methods for adhesively bonding the male and female section of a Pi-joint design could result in necessary repairs due to poor bonding. Furthermore, above-mentioned methods do not apply lean manufacturing concepts. Lean manufacturing technologies are aimed at eliminating "waste", such as wasted material, wasted time, and wasted money. Lean technologies include simpler, cheaper, more tailored manufacturing systems that enable reduced cycle times and cost.

As can be seen, there is a need for a method to adhesively bond a male and a female section of a Pi-joint design that incorporates the principles of lean manufacturing concepts. Furthermore, there is a need for a method to adhesively bond a male and a female section of a Pi-joint design that improves the quality of the adhesive bond while reducing cycle times and cost, for example, by eliminating clean-up of spilled adhesive and by eliminating steps such as installation and removal of the tape to seal openings of the Pi-joint design.

There has, therefore, arisen a need to provide a process for adhesive bonding of the sections of a Pi-joint design that enables a strong adhesive bond between the male and female sections of a Pi-joint design while eliminating blow-outs of adhesive and, therefore, the need to clean-up spills. There has further arisen a need to provide a process for adhesive bonding that does not require sealing of a Pi-joint openings and the removal of tape after the injection of the adhesive. There has still further arisen a need to provide a process for adhesive bonding that enables longer injection bond length.

SUMMARY OF THE INVENTION

The present invention provides an injection process for an adhesive that bonds the parts of a Pi-joint assembly. The present invention incorporates lean technologies that enable increased productivity during the assembly of a Pi-joint design using adhesive bonding. The present invention provides an adhesive injection process for Pi-joint assemblies that is suitable for, but not limited to, applications in the aerospace industry, such as the aircraft airframe assembly. The adhesive injection process may be used for the bonding of upper and lower skins to airframe structure as well as for structure-to-structure bonding.

In one aspect of the present invention, an adhesive injection process for a Pi-joint assembly comprises the steps of: inserting a filler into a gap between a male part and a female part of the Pi-joint assembly; applying a sealant above the filler; creating a, vacuum at the first port; injecting an adhesive through the second port; and drawing the adhesive towards the first port with the vacuum until the gap under the filler is completely filled with the adhesive. The filler is inserted above the first port and the second port in the female part. The sealant seals off the gap.

In another aspect of the present invention, an adhesive injection process for a Pi-joint assembly comprises the steps of: inserting a filler into a gap between a male part and a female part of the Pi-joint assembly; applying a sealant above the filler to seal off the gap; creating a vacuum at the second port; injecting an adhesive through the third port; drawing the adhesive towards the second port with the vacuum; creating a vacuum at the first port; injecting an adhesive through the second port; and drawing the adhesive towards the first port with the vacuum. The filler is inserted above the ports in the female part. The adhesive is drawn with the vacuum until the gap under the filler is completely filled with the adhesive.

In a further aspect of the present invention, a Pi-joint assembly comprises a female part including at least two ports; a male part inserted into the female part, a gap between the female part and the male part, a filler inserted into the gap above the at least two ports, a sealant applied above the filler, and an adhesive filling the bond area. The area of the gap underneath the filler is a bond area. The sealant seals the gap. The adhesive is injected through one of the ports. The adhesive is drawn towards another of the ports by a vacuum.

These and other features, aspects and advantages of the present invention will become better understood with reference to the following drawings, description and claims.

DETAILED DESCRIPTION OF THE INVENTION

Figure 1:
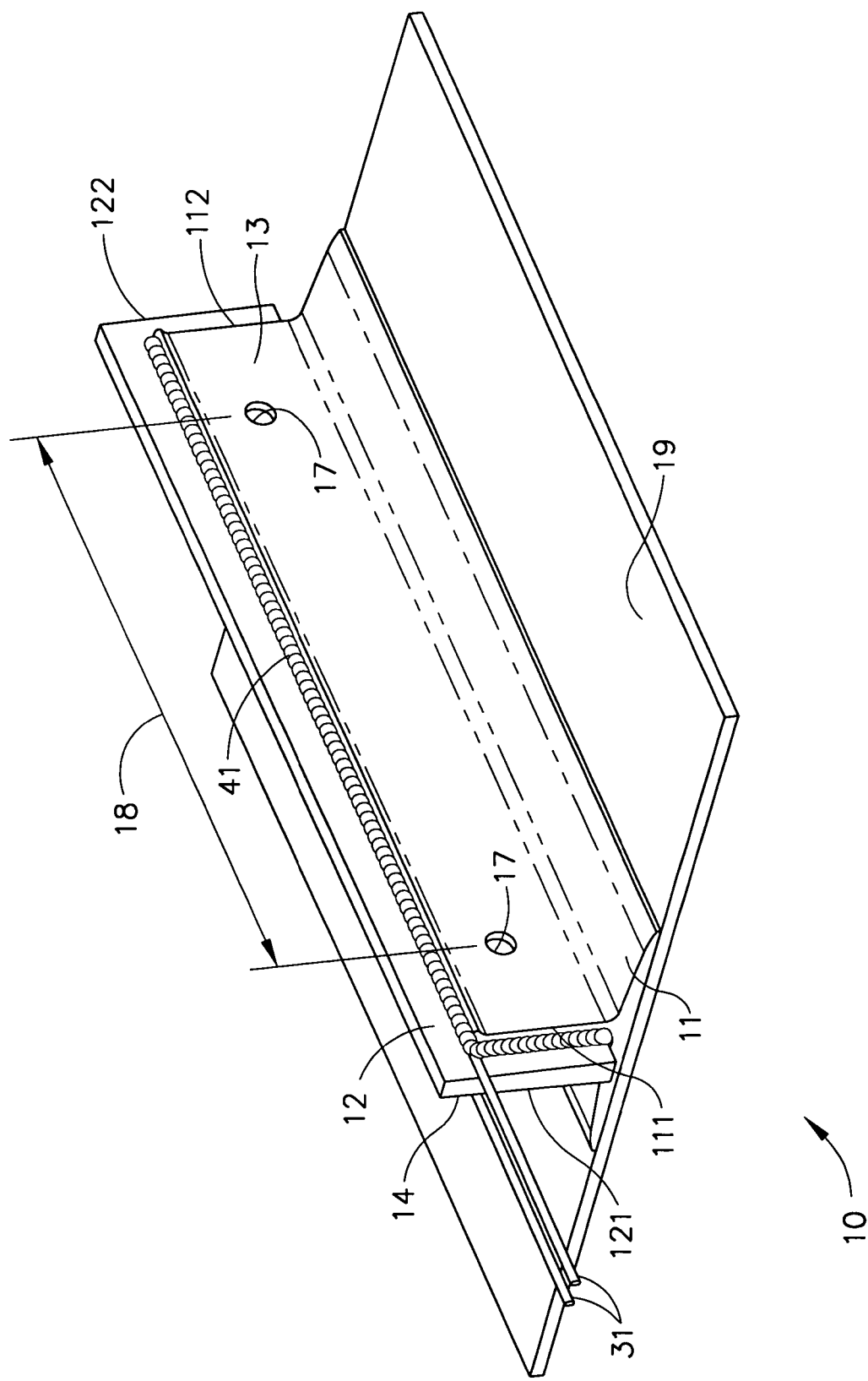
FIG. 1 is a perspective view of a Pi-joint assembly according to one embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides an adhesive injection process for Pi-joint assemblies that incorporates lean manufacturing technologies. One embodiment of the present invention provides an adhesive injection process for Pi-joint assemblies that is suitable for, but not limited to, applications in the aerospace industry, for example, during the aircraft airframe assembly. The adhesive injection process as in one embodiment of the present invention may be used, for example, to bond upper and lower skins to substructure as well as to bond structure to structure. The adhesive injection process for Pi-joint assemblies as in one embodiment of the present invention may be used, for example, during the assembly of the wings or the fuselage of an aircraft. In one embodiment of the present invention, a vacuum may be created that draws an adhesive evenly and efficiently along a gap between a female part and a male part of a Pi-joint assembly enabling an increased distance between adhesive injection ports compared to prior art adhesive injection methods, which solely rely on the flow of the adhesive within the gap. In another embodiment of the present invention, the gap between the female part and the male part of the Pi-joint assembly may be sealed with a sealant prior to the injection of the adhesive eliminating the need to install and remove a tape covering all openings of an Pi-joint assembly as typically done in the prior art. Furthermore, one embodiment of the present invention provides a filler that may be installed between the female part and the male part of the Pi-joint assembly. This filler prevents blow-outs of the injected adhesive that may occur using prior art adhesive bonding processes for Pi-joint designs.

In one embodiment, the present invention provides an adhesive injection process for Pi-joint assemblies that utilizes a vacuum to draw the injected adhesive at a controlled rate along a gap between a female part and a male part of a Pi-joint assembly. This is not possible in prior art adhesive bonding methods for Pi-joint assemblies that do not utilize vacuum. By attaching a vacuum pump to a port at a certain distance from the adhesive injection port, the injected adhesive may be drawn evenly and efficiently form the injection port to the vacuum port. Since the vacuum pulls the adhesive away from the injection port along the gap between the female part and the male part of the Pi-joint assembly, the length of the bond area that may be covered with the adhesive can be increased compared to prior art adhesive injection methods where the bond area covered with the adhesive typically depends on the size of the gap between the female part and the male part of a Pi-joint assembly and on the properties of the adhesive. Consequently, the distance between injection ports may be increased using the adhesive injection process as in one embodiment of the present invention compared to prior art adhesive injection methods.

In one embodiment, the present invention provides a filler inserted into the gap between the female part and the male part of the Pi-joint assembly above the bond area. The filler may keep the bond area clean and may prevent blow-outs and spills of the adhesive. Contrary to the prior art, where typically tape is used to cover the gap between the female part and the male part of the Pi-joint assembly, the filler as in one embodiment of the present invention does not need to be removed after injection of the adhesive. Furthermore, the filler used in one embodiment of the present invention may be flexible to conform easily to surface irregularities and, therefore, may be installed effortless, and may, therefore, cover the openings of the Pi-joint assembly more effectively than the tape typically used in prior art adhesive bonding methods for Pi-joint assemblies.

In one embodiment, the present invention utilizes a sealant that covers all openings of the Pi-joint assembly. Contrary to prior art adhesive bonding methods for Pi-joint assemblies where the sealant is installed after the application and the curing of the adhesive, the sealant as in one embodiment of the present invention may be applied above the filler to seal all openings of the Pi-joint assembly (except for the injection ports used) before the injection of the adhesive. Consequently, the tape typically used in prior art methods and the steps of installing and removing the tape can be eliminated. Furthermore, the sealant as in one embodiment of the present invention may prevent blow-outs of the adhesive and, consequently, may eliminate the need to clean up adhesive spills, which is not always possible using the prior art tape. The sealant as in one embodiment of the present invention also protects the bond area of the Pi-joint assembly and, therefore, does not have to be removed after application of the adhesive as it is the case with the tape typically used in prior art adhesive bonding methods for Pi-joint structures.

In one embodiment, the present invention incorporates lean technologies by eliminating "waste" in materials and manufacturing time. By eliminating the tape typically used in prior art adhesive bonding methods for Pi-joint designs through application of a filler and a sealant prior to the injection of the adhesive as in one embodiment of the present invention, the assembly cycle time and the assembly cost may be reduced compared to prior art methods. By utilizing a vacuum to draw the adhesive through the Pi-joint assembly at a constant rate as in one embodiment of the present invention, the quality of the bond and, therefore, the quality of the Pi-joint assembly may be improved compared to prior art methods that do not utilize vacuum. Furthermore, by using vacuum, the length of the bond from the injection point may be increased compared to prior art methods that do not use vacuum and, therefore, the assembly cycle time may be reduced. The use of a sealer to protect the bond area by sealing the openings of a Pi-joint assembly before the injection of the adhesive as in one embodiment of the present invention, eliminates the need for installation and removal of a tape typically used in prior art bonding methods and, also, prevents blow-outs of the adhesive during the application of the adhesive, which eliminates the need to clean-up adhesive spills. By utilizing a filler and a sealer that do not have to be removed, and by utilizing vacuum during the adhesive injection process for Pi-joint assemblies as in one embodiment of the present invention, a reduced cycle time, improved assembly quality, improved product repeatability and consistency, and reduced assembly cost compared to prior art adhesive bonding methods for Pi-joint assemblies can be accomplished.

Figure 2:
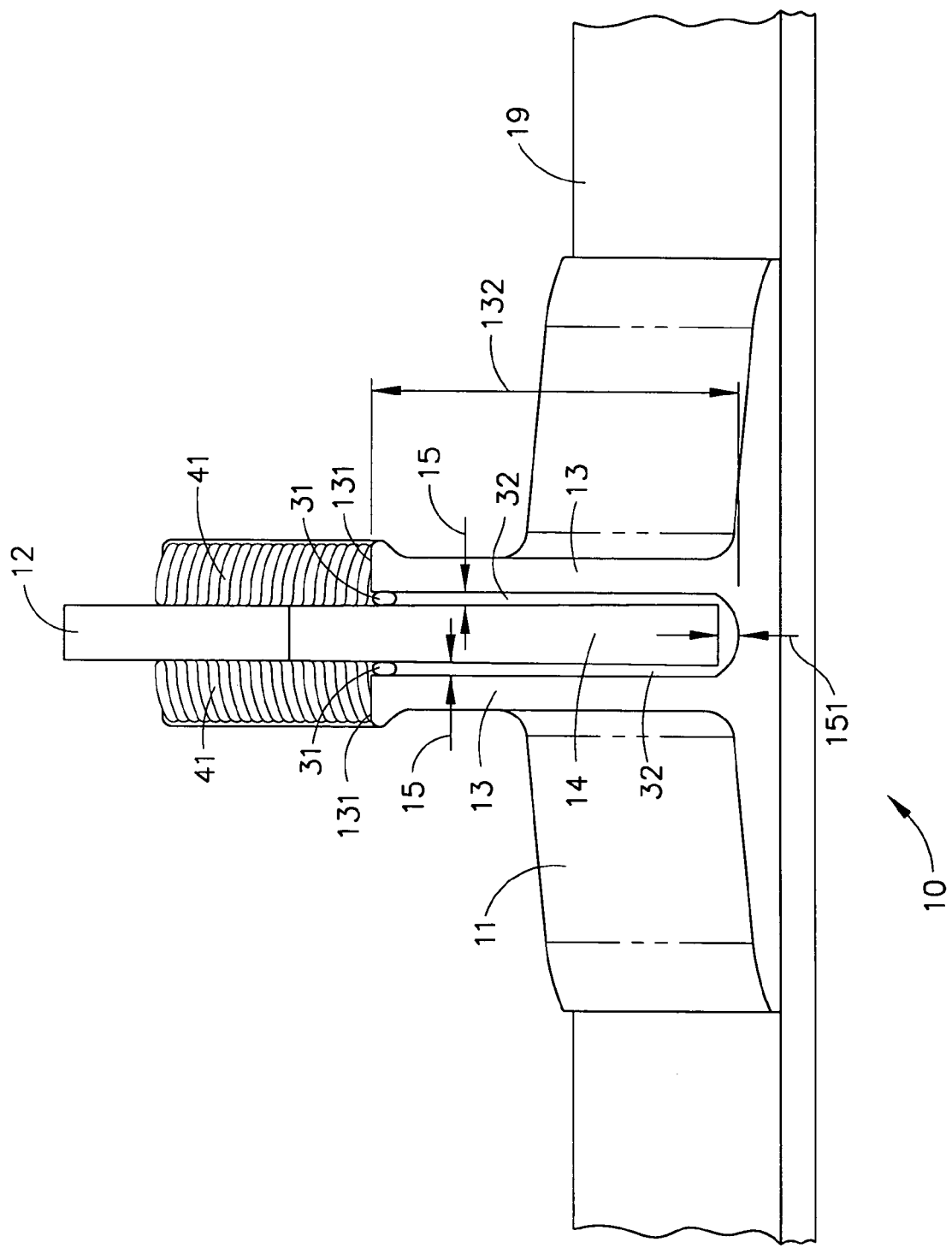
FIG. 2 is a cross-sectional view of a Pi-joint assembly according to one embodiment of the present invention.

Referring now to FIGS. 1 and 2, a Pi-joint assembly 10 is illustrated according to one embodiment of the present invention. The Pi-joint assembly 10 includes a female part 11 and a male part 12. The female part 11 may have the shape of a Pi-clevis and may include two Pi-legs 13. The female part 11 may extend longitudinally from a front end 111 to a back end 112. The male part 12 may have the shape of a rectangular prism that may have a narrow cross-section 14 and that may extend longitudinally from a front end 121 to a back end 122. The front end 121 and the back end 122 of the male part 12 may extend the front end 111 and the back end 112 of the female part 11. The dimensions of the cross-section 14 of the male part 12 may be selected such that male part 12 fits into the female part 11 while providing a gap 15 between the male part 12 and the female part 11 after inserting the male part 12 into the female part 11, as shown in FIG. 2. The male part 12 may be inserted into the female part 11 such that a bottom gap 151 remains, as shown in FIG. 2. The Pi-leg 13 may have a top 131 and a height 132. The female part 11 may include at least two ports 17, such as holes drilled into one of the Pi-legs 13. The ports 17 may be machined into the Pi-leg 13 of the female part 11 approximately at half of the height 132 of the Pi-leg 13. One port 17 may be positioned close to the front end 111 of the female part 11 and the other port 17 may be positioned close to the back end 112 of the female part 11. The at least two ports 17 may be located at a distance 18 apart from each other (shown in FIG. 1). The distance 18 may be, for example, 48 inches. The distance 18 may be determined depending on the velocity of the adhesive used for bonding the female part 11 and the male part 12 and on the size of the gap 15 between the female part 11 and the male part 12. The size of the ports 17, such as the diameter of the drilled hole, may be selected depending on the size of the vacuum fitting 42 and the size of the adhesive injection tool 56 (shown in FIGS. 4, 5 and 6). The ports 17 may be included in one or both Pi-legs 13 depending on the velocity of the adhesive, the size of the gap 15 and the adhesive bond desired. In some application it may be desirable to seal off the bottom gap 151 between the female part 11 and the male part 12, for example, with a sealant or a rubber tube. In this case, at least two ports 17 may be needed on each of the two Pi-legs 13. The female part 11 may be in a fixed connection with a larger part 19, such as an aircraft skin. The male part may be part of an aircraft structure or substructure.

Figure 3:
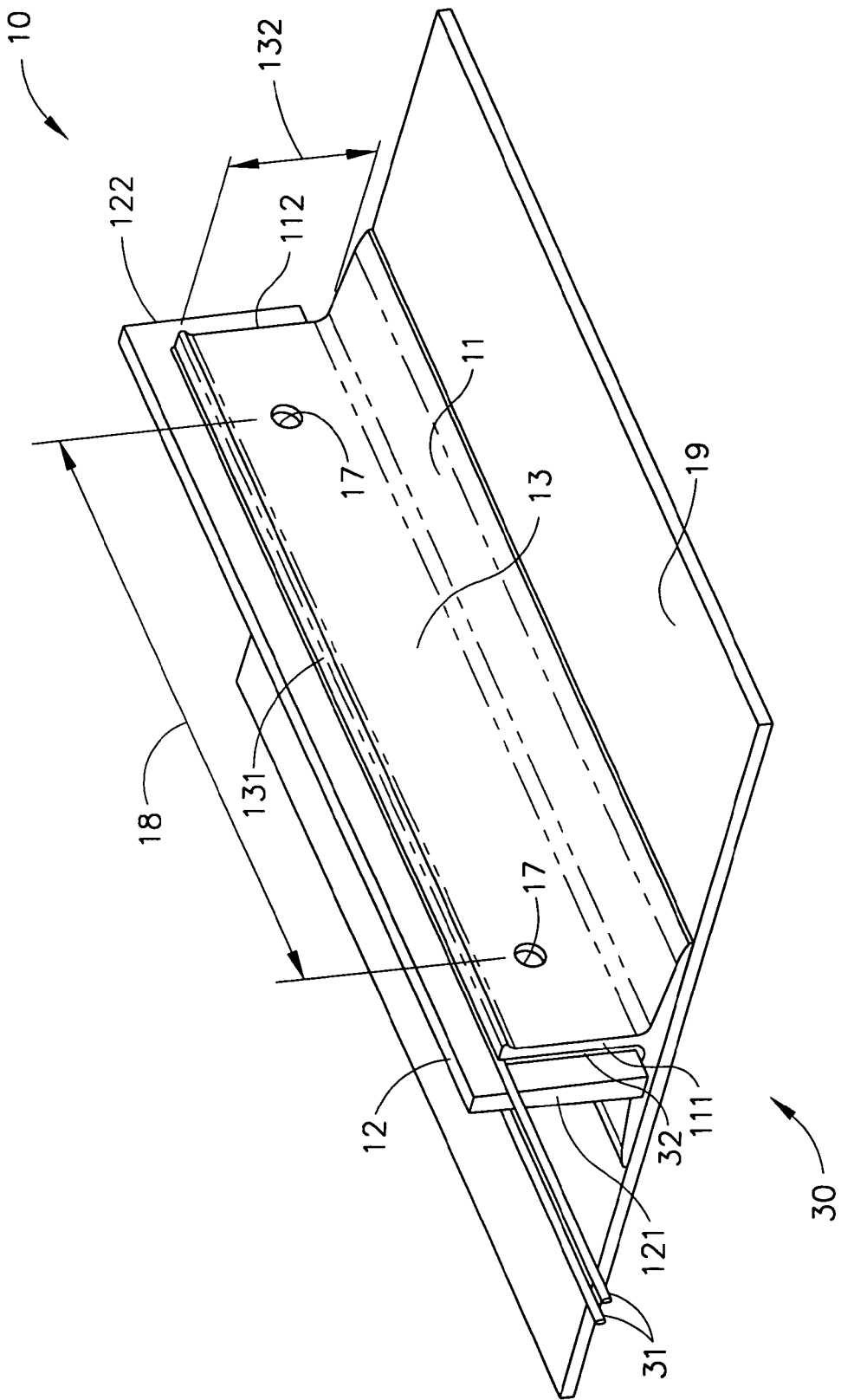
FIG. 3 is a perspective view of a first implementation of a Pi-joint assembly according to one embodiment of the present invention.

Referring now to FIG. 3, a first implementation 30 of the Pi-joint assembly 10 is illustrated according to one embodiment of the present invention. A filler 31 may be inserted into the gap 15 between the male part 12 and the female part 11 proximate to the top 131 of the Pi-leg 13 (also shown in FIG. 2). The filler 31 may be inserted in the gap 15 close to the top 131 of the Pi-leg 13 and above the ports 17. The filler 31 may be inserted into the gap 15 such that the filler 31 extends longitudinally on both sides of the male part 11. The area of the gap 15 between the female part 11 and the male part 12 underneath the filler 31 may be the bond area 32 (also shown in FIG. 2). The filler 31 may be made of a material that is flexible, conforms easily to different shapes and surface irregularities, is lightweight and age-resistant, and is easy to install. The filler 31 may be for example, Gore®Skyflex™ manufactured by W.L. Gore & Associates, Inc., Newark, Del., U.S.A. The filler 31 may keep the bond area 32 clean and may assist in preventing blow-outs of the adhesive 71 (shown in FIG. 7) during the injection of the adhesive 71.

Figure 4:
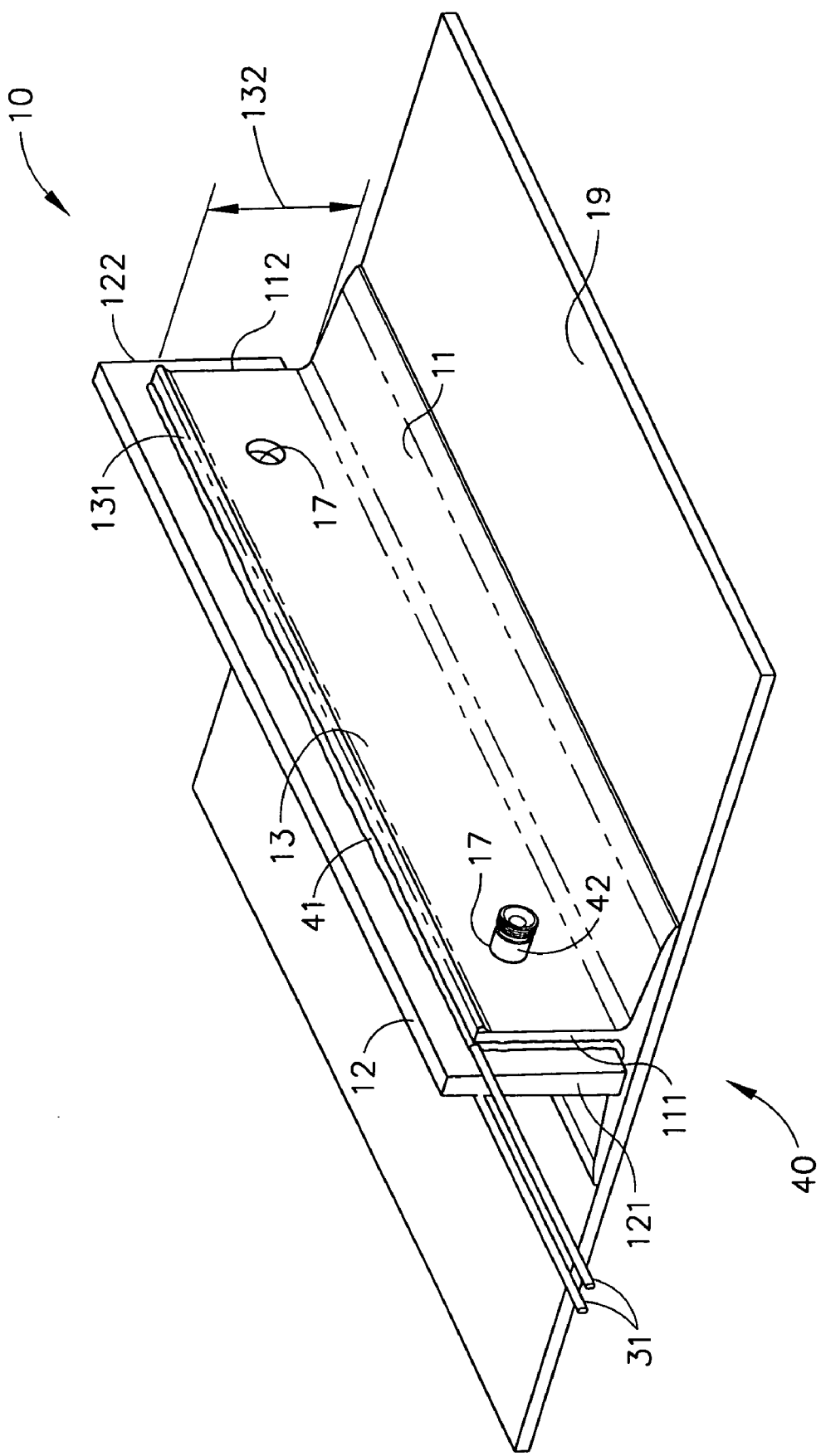
FIG. 4 is a perspective view of a second implementation of a Pi-joint assembly according to one embodiment of the present invention.

Referring now to FIG. 4, a second implementation 40 of the Pi-joint assembly 10 is illustrated according to one embodiment of the present invention. As can be seen, a sealant 41 may be applied above the filler 31 to seal off the gap 15 between the female part 11 and the male part 12. The sealant may also be applied to seal the gap 15 at the front end 111 and at the back end 112 of the female part 11, as shown in FIGS. 1 and 4. The sealant 41 may be manufactured, for example, from polysulfide or silicone. Furthermore, it may be possible to use any type of sealer suitable for aircraft application as sealer 41. The sealer 41 may be chosen according to the engineering requirements and according to the application of the Pi-joint assembly 10. Since the bond area 32 is protected by the filler 31, the sealant 41 may not intrude into the bond area 32. As shown in FIG. 4, a fitting 42 may be inserted into one of the ports 17. The fitting 17 may be a vacuum fitting for attaching a vacuum pump 54 (shown in FIGS. 5 and 6).

Figure 5:
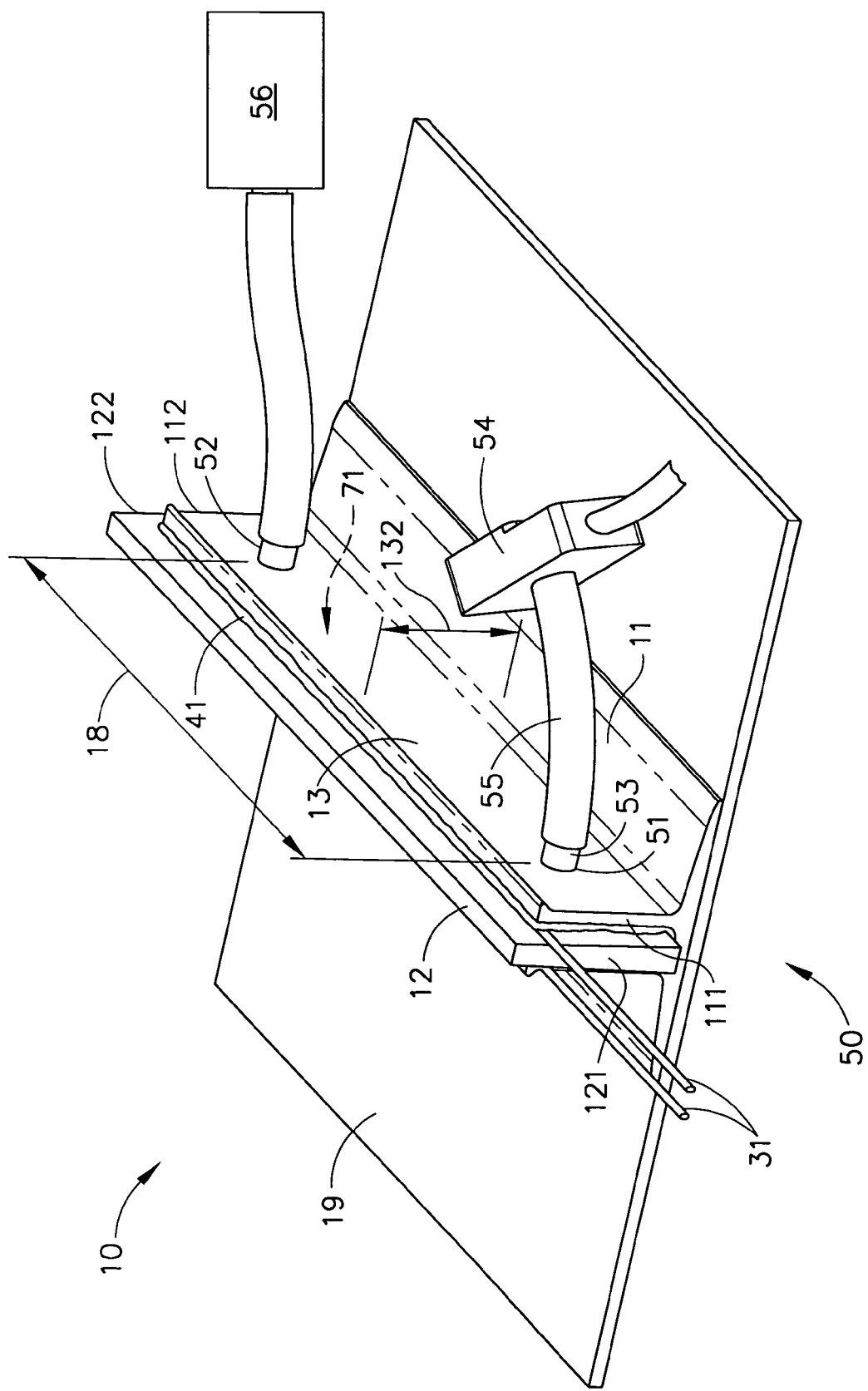
FIG. 5 is a perspective view of a first operation mode according to one embodiment of the present invention.
Figure 7:
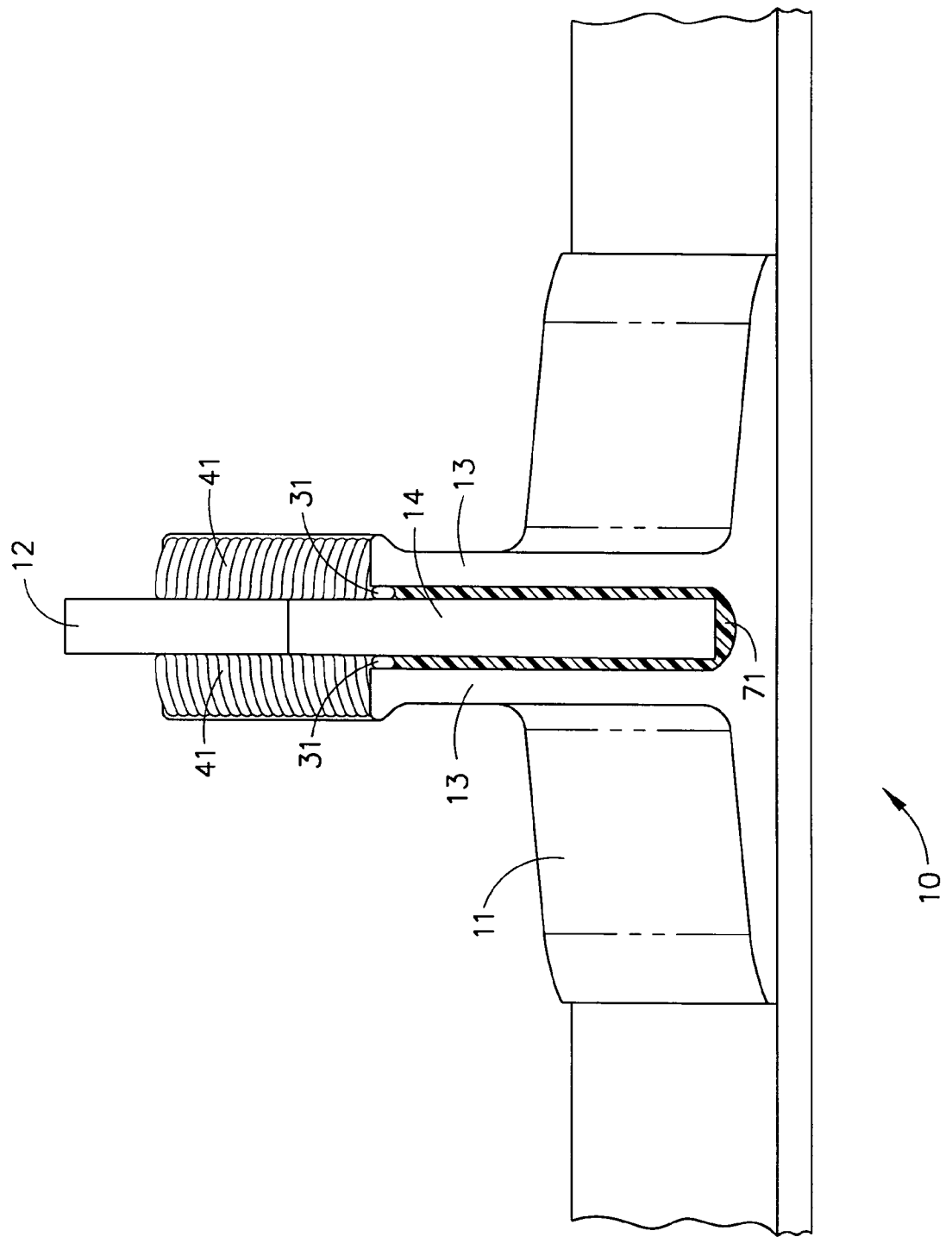
FIG. 7 is a cross-sectional view of an adhesively bonded Pi-joint assembly according to one embodiment of the present invention.

Referring now to FIG. 5, a first operation mode 50 is illustrated according to one embodiment of the present invention. The Pi-joint assembly 10 may include a first port 51 and a second port 52 machined into the Pi-leg 13 of the female part 12. The filler 31 may be inserted into the gap 15 and the sealant 41 may be applied above the filler 32 to seal off the gap 15 between the female part 11 and the male part 12 of the Pi-joint assembly 10. A vacuum fitting 53 may be inserted into the first port 51. A vacuum pump 54 may be connected to the vacuum fitting 53 via a vacuum tube 55. An adhesive injection tool 56 may be connected with the second port 52 such that an adhesive 71 (shown in FIG. 7) may be injected through the second port 52. It may be necessary in some applications to insert a second fitting 57 into the second port 52 to attach the adhesive injection tool 56 depending on the type of adhesive injection tool 56 used. After connecting the vacuum pump 54 and the adhesive injection tool 56 to the sealed Pi-joint assembly 10, the vacuum pump may be turned on creating a vacuum within the sealed gap 15 and, therefore, within the bond area 32. The injection of the adhesive 71 (FIG. 7) through the second port 52 may be now started. While the adhesive 71 is injected into the port 52, the vacuum draws the adhesive 71 towards the first port 51. The bond area 32 may be covered evenly and completely with the injected adhesive 71. When the adhesive 71 exits the vacuum fitting 53 and becomes visible inside the vacuum tube 55, the vacuum pump 54 and the adhesive injection tool 56 may be shut off. The bonding area 32 may now be filled completely with the injected adhesive 71, as shown in FIG. 7. The adhesive injection tool 56, the vacuum pump 54, the vacuum tube 55, and the vacuum fitting 53 may now be removed from the Pi-joint assembly 10. Remaining adhesive 71 may be removed from the ports 51 and 52, for example, by wiping off. The ports 51 and 52 may become sealed with adhesive 71. The adhesive 71 may provide an adhesive bond between the female part 11 and the male part 12 of the Pi-joint assembly 10 when cured. The filler 31 and the sealant 41 may not be removed from the Pi-joint assembly 10. The sealant 41 may provide protection for the adhesive joint of the Pi-joint assembly 10 during application on an aircraft.

Figure 6:
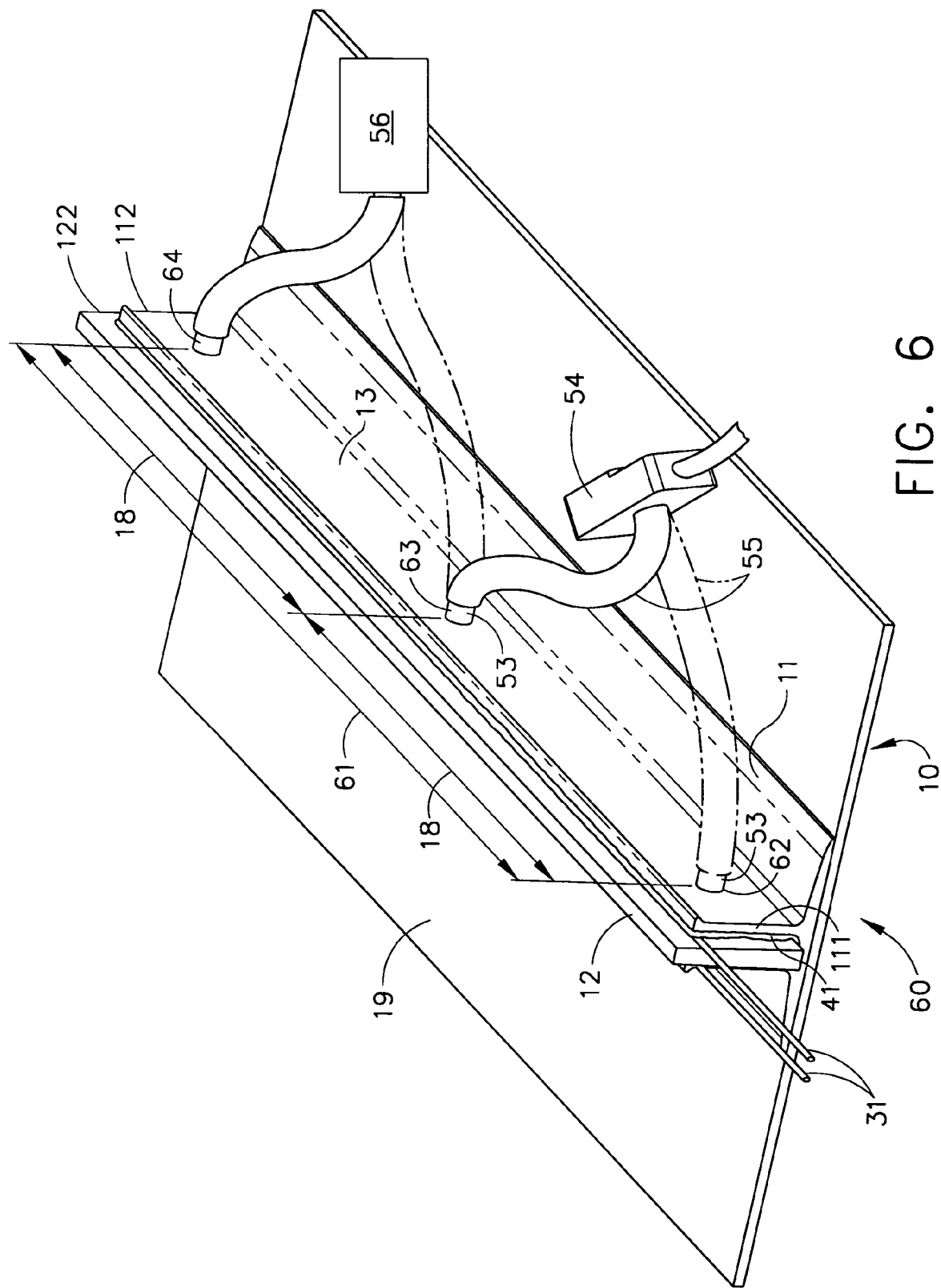
FIG. 6 is a side view of a second operation mode according to another embodiment of the present invention.

Referring now to FIG. 6, a second operational mode 60 is illustrated according to one embodiment of the present invention. In some applications, the distance 18 between two ports 17, as illustrated in FIG. 1, may not be long enough to cover the bond area 32 over the whole length 61 of the Pi-joint assembly 10. In this case, more than two ports 17 (as shown in FIG. 1) may be needed. All ports 17 may be evenly distributed over the length 61 from the front end 111 to the back end 112 of the female part 11. As illustrated in FIG. 6, the Pi-joint assembly 10 may include a port 62, a port 63, and a port 64. Port 62 may be positioned close to the front end 111 of the female part 11, the port 64 may be positioned close to the back end 112 of the female part 11, and the port 63 may be positioned between the ports 62 and 64 at an equal distance 18 to port 62 and to port 64. After inserting the filler 31 into the gap 15 (FIGS. 2 and 3) and after application of the sealing 41 to the gap 15 as described above, the vacuum fitting 53 may be inserted into port 63 and the vacuum pump 54 may be connected with the vacuum fitting 53 via the vacuum tube 55. The adhesive injection tool 56 may be connected with the port 64. The bond area 32 between the port 63 and the port 64 may now be filled with the adhesive 71 as described above. After disconnecting the adhesive injection tool 56 from the port 64, after disconnecting the vacuum pump 54 from the port 63, and after removing the vacuum fitting 53 from the port 63, the adhesive injection tool 56 may now be connected with the port 63. The vacuum fitting 53 may now be inserted into the port 62 and the vacuum pump 54 may be attached to the vacuum fitting 53 via the vacuum tube 55. The bond area 32 between port 62 and 63 may now be filled with the adhesive 71 as described above. Since more than the three ports 62, 63, and 64 shown in FIG. 6 may be machined into the Pi-leg 13 of the female part 11 of the Pi-joint assembly 10, there may not be a limit for the length 61 of the Pi-joint assembly 10 that may be bonded using the described adhesive bonding process. Furthermore, it may be possible to use more than one vacuum pump 54 and more than one adhesive injection tool 56 at the same time to further reduce the cycle time of the adhesive injection process.

Referring now to FIG. 7, an adhesively bonded Pi-joint assembly 10 is illustrated according to one embodiment of the present invention. As can be seen, the bond area 32 (FIG. 2) of the Pi-joint assembly 10 may be filled with an adhesive 71. The adhesive may be selected according to the materials of the female part 11 and the male part 12 to be bonded. It may be possible to adhesively bond metal-to-metal, composite-to-composite, or metal-to-composite. Furthermore, the adhesive may be chosen according to the engineering requirements and the application of the Pi-joint assembly.

Figure 8:
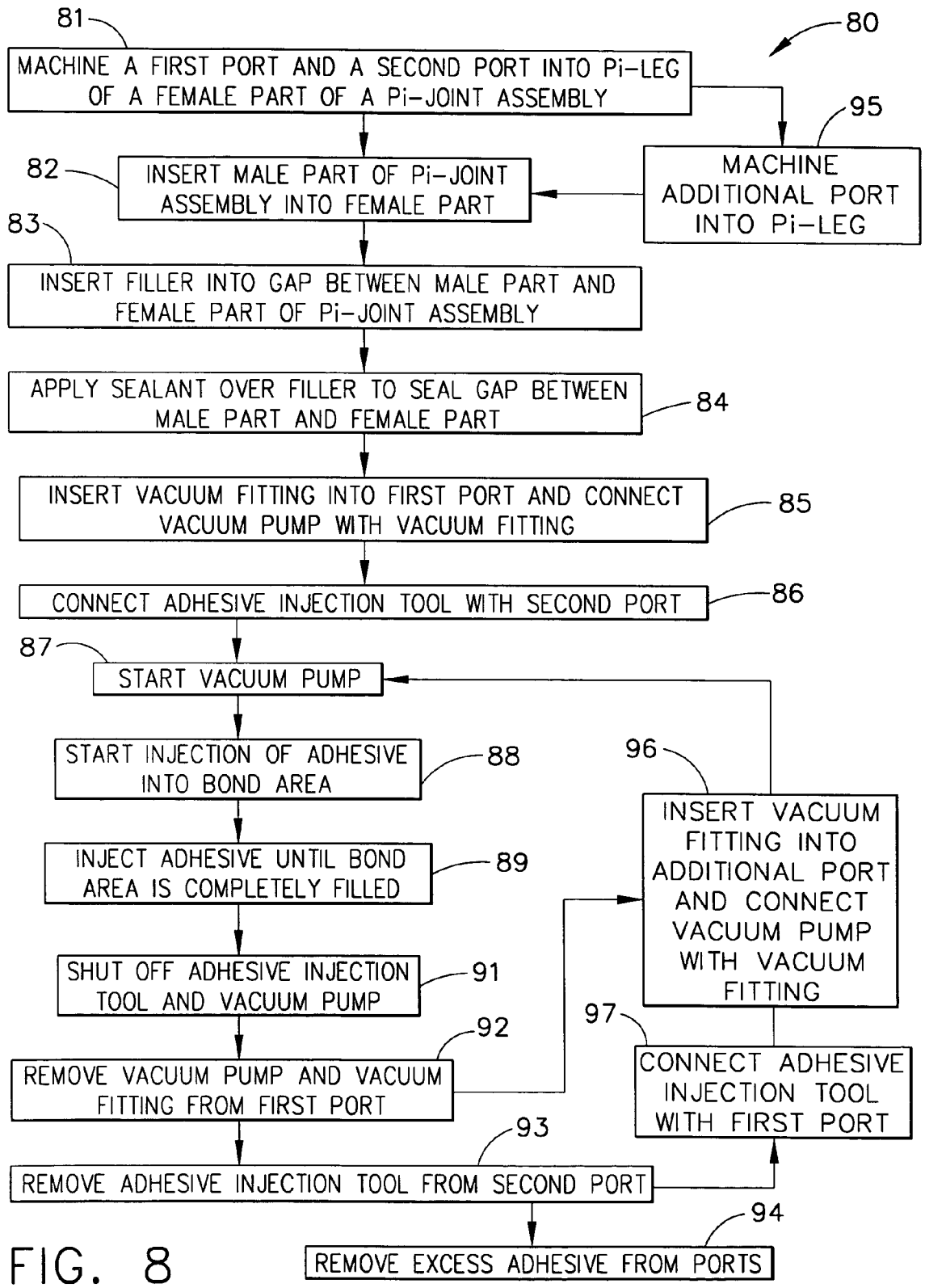
FIG. 8 is a flow chart of an adhesive injection process for Pi-joint assemblies according to another embodiment of the present invention.

Referring now to FIG. 8, an adhesive injection process 80 for a Pi-joint assembly 10 is illustrated according to another embodiment of the present invention. The adhesive injection process 80 may include the steps of: machining a first port 51 and a second port 52 into a Pi-leg 13 of a female part 11 of a Pi-joint assembly 10 (step 81) and inserting a male part 12 of the Pi-joint assembly 10 into the female part 11 (step 82), as shown in FIGS. 1 and 2. In Step 83, a filler 31 may then be inserted in a gap 15 between the female part 11 and the male part 12 (FIG. 3). A sealant 41 may be applied over the filler 31 to seal the gap 15 of the Pi-joint assembly 10 in step 84 (FIG. 4). A vacuum fitting 53 may be inserted into the first port 51 and a vacuum pump 54 may be connected with the fitting 53 via a vacuum tube 55 in step 85 (FIG. 5). In step 86, an adhesive injection tool 56 may be connected with the second port 52 (FIG. 5), such that the adhesive may be injected into a bond area 32 of the Pi-joint assembly 10 through the second port 52. Now, the vacuum pump 54 may be started in step 87 and, subsequently, the injection of the adhesive 71 into the bond area 32 may start in step 88. The adhesive 71 may be injected until the adhesive 71 exits the vacuum fitting 53 and is visible in the vacuum tube 55 in step 89. At this point, the bond area 32 may be completely filled with the adhesive 71. In step 91, the adhesive injection tool 56 and the vacuum pump 54 may be shut off. The vacuum pump 54 may be disconnected from the first port 51 and the vacuum fitting 53 may then be removed from the first port 51 in step 92. The adhesive injection tool 56 may also be disconnected from the second port 52 (step 93). Excess adhesive 71 may be removed from the ports (for example, ports 51 and 52) in step 94, for example, by wiping off. An additional port 62 (FIG. 6) may be machined into the Pi-leg 13 in step 95 (FIG. 6). In this case, after removing the vacuum fitting 53 and the vacuum pump 54 from the first port 51 (FIG. 5) or 63 (FIG. 6) in step 92 and after removing the adhesive injection tool 56 from the second port 52 (FIG. 5) or 64 (FIG. 6) in step 93, the vacuum fitting 53 may now be inserted into the additional port 62 in step 96 and the adhesive injection tool 56 may be inserted into the port 51 or 63 in step 97, as shown in FIG. 6. Steps 87 to 94 may now be repeated. Depending on the length 61 of the Pi-joint assembly 10 it may be necessary to machine more than three ports 17 into the Pi-leg 13 to ensure the complete filling of the bond area 32 with the adhesive 71.

It should be understood, of course, that the foregoing relates to exemplary embodiments of the invention and that modifications may be made without departing from the spirit and scope of the invention as set forth in the following claims.

We claim:

1. An adhesive injection process for a Pi-joint assembly, comprising the steps of:
   inserting a filler into a gap between a male part and a female part of said Pi-joint assembly above a first port and a second port in said female part;
   applying a sealant above said filler to seal off said gap, and, after applying said sealant above said filler to seal off said gap:
   creating a vacuum at said first port;
   injecting an adhesive through said second port; and
   drawing said adhesive towards said first port with said vacuum for filling said gap under said filler with said adhesive.

2. The adhesive injection process for a Pi-joint assembly of claim 1, further comprising the step of:

creating said first port and said second port in said female part of said Pi-joint assembly,
wherein said creating a vacuum at said first port comprises:
  inserting a vacuum fitting into said first port; and
  connecting a vacuum pump to said vacuum fitting via a vacuum tube, and
wherein said injecting an adhesive through said second port comprises:
  connecting an adhesive injection tool to said second port; and
  injecting said adhesive through said second port by said adhesive injection tool.

3. The adhesive injection process for a Pi-joint assembly of claim 1, further comprising the steps of:
  machining said first port and said second port into one Pi-leg of said female part that extends longitudinally from a front end to a back end of said female part;
  positioning said first port close to said front end of said female part; and
  positioning said second port close to said back end of said female part.

4. The adhesive injection process for a Pi-joint assembly of claim 1, further comprising the step of inserting said male part into said female part of said Pi-joint assembly before inserting said filler.

5. The adhesive injection process for a Pi-joint assembly of claim 2, further comprising the steps of:
  shutting off said vacuum pump and said adhesive injection tool when said adhesive is visible in said vacuum tube;
  disconnecting said vacuum pump from said vacuum fitting;
  removing said vacuum fitting from said first port;
  disconnecting said adhesive injection tool from said second port; and
  removing excess adhesive from said first port and from said second port.

6. The adhesive injection process for a Pi-joint assembly of claim 3, further comprising the steps of:
  machining an additional port into said one Pi-leg of said female part; and
  positioning said first port, said second port, and said additional port evenly distributed from said front end to said back end of said female part.

7. The adhesive injection process for a Pi-joint assembly of claim 6, further comprising the steps of:
  creating said vacuum at said additional port;
  injecting said adhesive through said first port; and
  drawing said adhesive towards said additional port with said vacuum for filling said gap under said filler with said adhesive.

8. The adhesive injection process for a Pi-joint assembly of claim 3, further comprising the steps of:
  creating a third port and a fourth port within another Pi-leg of said female part of said Pi-joint assembly;
  sealing off a bottom gap between said male part and said female part, and, after sealing off the bottom gap between said male part and said female part:
    creating said vacuum at said third port;
    injecting said adhesive through said fourth port; and
    drawing said adhesive towards said third port with said vacuum for filling said gap under said filler with said adhesive.

9. An adhesive injection process for a Pi-joint assembly, comprising the steps of:
  inserting a filler into a gap between a male part and a female part of said Pi-joint assembly above a first port, a second port, and a third port in said female part;
  applying a sealant above said filler to seal off said gap, and, after sealing off said gap with said sealant:
    creating a vacuum at said second port;
    injecting an adhesive through said third port;
    drawing said adhesive towards said second port with said vacuum for filling said gap under said filler with said adhesive;
    creating a vacuum at said first port;
    injecting said adhesive through said second port; and
    drawing said adhesive towards said first port with said vacuum for further filling said gap under said filler with said adhesive.

10. The adhesive injection process for a Pi-joint assembly of claim 9, further comprising the step of:
  creating said first port, said second port, and said third port in said female part of said Pi-joint assembly,
  wherein creating a vacuum at said second port comprises:
    inserting a vacuum fitting into said second port; and
    connecting a vacuum pump to said vacuum fitting via a vacuum tube;
  wherein injecting an adhesive through said third port comprises:
    connecting an adhesive injection tool to said third port; and
    injecting said adhesive through said third port by said adhesive injection tool;
  further comprising the steps of:
    disconnecting said vacuum pump and said vacuum fitting from said second port; and
    disconnecting said adhesive injection tool from said third port,
  wherein creating a vacuum at said first port comprises:
    inserting said vacuum fitting into said first port; and
    connecting said vacuum pump to said vacuum fitting via said vacuum tube; and
  wherein injecting said adhesive through said second port comprises:
    connecting said adhesive injection tool to said second port; and
    injecting said adhesive through said second port by said adhesive injection tool.

11. The adhesive injection process for a Pi-joint assembly of claim 10, further comprising the steps of:
  disconnecting said adhesive injection tool from said second port;
  disconnecting said vacuum pump from said vacuum fitting;
  removing said vacuum fitting from said first port; and
  removing excess adhesive from said first port, said second port, and said third port.

12. The adhesive injection process for a Pi-joint assembly of claim 9, further comprising the steps of:
  machining said first port, said second port, and said third port into one Pi-leg of said female part that extends longitudinally from a front end to a back end of said female part;
  positioning said first port close to said front end of said female part;
  positioning said third port close to the back end of said female part; and
  positioning said second port between said first port and said third port at an equal distance from said first port and from said third port.

13. The adhesive injection process for a Pi-joint assembly of claim 12, further comprising the steps of:
  machining one additional port into said one Pi-leg of said female part; and distributing said first port, said second port, said third port, and said additional port evenly between said front end and said back end of said female part of said Pi-joint assembly.

14. The adhesive injection process for a Pi-joint assembly of claim 12, wherein said inserting a filler into a gap between a male part and a female part of said Pi-joint assembly further comprises the step of positioning said filler proximate to a top of said one Pi-leg of said female part.

15. The adhesive injection process for a Pi-joint assembly of claim 14, further comprising the steps of;
   machining at least two additional ports into another Pi-leg of said female part;
   sealing off a bottom gap between said male part and said female part;
   creating said vacuum at one port of said at least two additional ports;
   injecting said adhesive through another port of said at least two additional ports; and
   drawing said adhesive towards said one of said at least two additional ports with said vacuum for filling said gap.

16. The adhesive injection process for a Pi-joint assembly of claim 1, wherein said sealant comprises one of a polysulfide or a silicone sealant.

17. The adhesive injection process for a Pi-joint assembly of claim 1, wherein said male part comprises a part of an aircraft structure, and wherein said female part comprises a fixed connection with an aircraft skin.

\* \* \* \* \*